United States Patent [19]

Imai et al.

[11] 4,200,217
[45] Apr. 29, 1980

[54] METHOD OF MANUFACTURING AN ARTICLE HAVING A PRESS-WORKED MEMBER INWARDLY OF A CYLINDRICAL MEMBER

[75] Inventors: Kuninori Imai, Kanagawa; Soji Takahashi, Hachioji; Masamoto Akeyama, Kokubunji, all of Japan

[73] Assignee: Hitachi, Ltd., Japan

[21] Appl. No.: 819,056

[22] Filed: Jul. 26, 1977

[30] Foreign Application Priority Data

Aug. 6, 1976 [JP] Japan ................... 51-93186

[51] Int. Cl.² ............................................. B23K 31/02
[52] U.S. Cl. ................................... 228/161; 228/131; 228/173 A; 228/193; 228/205; 29/602 R; 29/522 R
[58] Field of Search ........... 228/128, 131, 161, 173 A, 228/193, 265, 205; 29/507, 522 R, 602

[56] References Cited

U.S. PATENT DOCUMENTS

| | | | |
|---|---|---|---|
| 2,753,623 | 7/1956 | Boessenkool et al. | 228/205 |
| 2,816,211 | 10/1957 | Hutchins | 228/128 X |
| 3,315,333 | 4/1967 | Kind et al. | 29/522 X |
| 3,535,762 | 10/1970 | Taylor | 228/265 X |
| 3,893,226 | 7/1975 | Waite | 228/193 X |
| 3,937,385 | 2/1976 | Asada et al. | 228/131 |
| 4,015,765 | 4/1977 | Ahmed | 228/131 |

*Primary Examiner*—Charlie T. Moon
*Assistant Examiner*—K. J. Ramsey
*Attorney, Agent, or Firm*—Craig and Antonelli

[57] ABSTRACT

This invention relates to a method of manufacturing an article having a press-worked member inwardly of a cylindrical member, which comprises a first step for removing stain and oxidation film on the inner surface of a cylindrical member and on the peripheral side surface of a blank, a second step for arranging the blank inwardly of the cylindrical member so that the purified side surface of the blank may be faced toward the purified internal surface of the cylindrical member, a third step for subjecting the blank to a cold press-working inside the cylindrical member to thereby closely combine the blank with the cylindrical member, a fourth step for further subjecting the cold-worked blank to a hot press-working inside the cylindrical member to thereby form the blank into a desired shape within the cylindrical member, and a fifth step for annealing the combined members at a temperature for diffusion to thereby join the blank with the cylindrical member by diffusion. After that, a machining step such as cutting, milling or so on, is followed to provide a finished product of a desired shape. Also, such a machining step can be carried out between the fourth step and the fifth step.

19 Claims, 25 Drawing Figures

FIG. 1
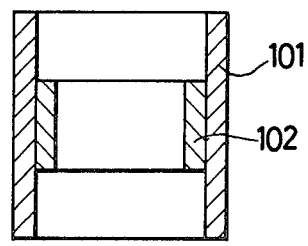
FIG. 2A  FIG. 2B  FIG. 2C
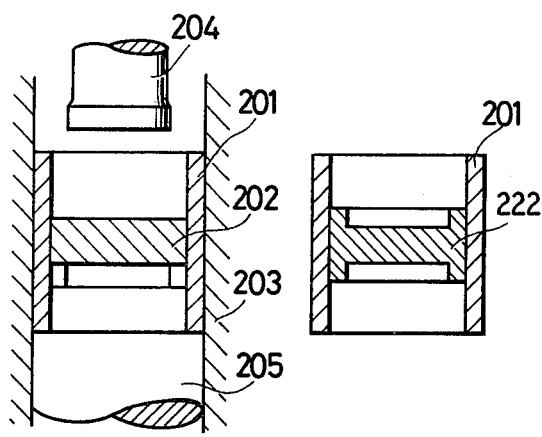
FIG. 3A  FIG. 3B  FIG. 3C
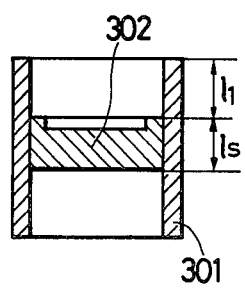 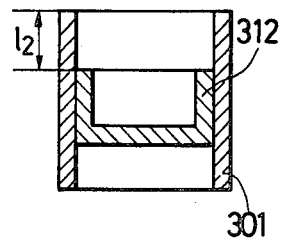 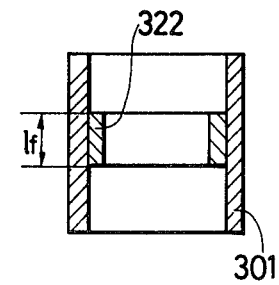

METHOD OF MANUFACTURING AN ARTICLE HAVING A PRESS-WORKED MEMBER INWARDLY OF A CYLINDRICAL MEMBER

BACKGROUND OF THE INVENTION

This invention relates to a method of manufacturing an article having a press-worked member inwardly of a cylindrical member, particularly, for use in a magnetron.

As shown in FIG. 1, when manufacturing an article having a member 102 joined inwardly of a cylindrical (or tubular) member 101, in a conventional method, the members 101 and 102 are joined by soldering or welding after having been made apart. But when the soldering method is applied to mass production of the article, the clearance between the members 101 and 102 is provided so that the member 102 may be easily inserted into the tubular member 101, so that a large quantity of solders are required, the relative position of the members 101 and 102 is apt to be deviated, many tools for positioning the members 101 and 102 are required, the solders required are costly and so on. Therefore, the soldering method is not adapted to the mass production of the above-mentioned article.

Also, in the welding method, it is difficult to join the whole of contact surface of the members 101 and 102. In an article, that is, a magnetron anode, which exhausts heat from inside to outside, thermal resistance is increased if there is any non-contacting point between the members 101 and 102, so that the temperature in the article is remarkably raised and finally causes damage.

Accordingly, the conventional method, either in the soldering method or in the welding method, has the above-mentioned disadvantages.

SUMMARY OF THE INVENTION

It is an object of the present invention to eliminate the above-mentioned disadvantages in the prior art method.

It is another object to provide a method of manufacturing an article having a press-worked member of an optional shape which has been tightly joined with a cylindrical member inwardly of the cylindrical member.

It is a still further object to provide a method adapted to mass production of an article having a press-worked member which has been tightly joined with a cylindrical member inwardly of the cylindrical member.

To carry out the above-mentioned objects, the present invention comprises a first step for removing stain and oxidation film on the internal surface of a cylindrical (or tubular) member and on the peripheral side surface of a metal block (or blank), a second step for arranging the blank inwardly of the cylindrical member so that the purified side surface of the blank may be faced toward the purified internal surface of the cylindrical member, a third step for subjecting the blank to a cold press-working within the cylindrical member to thereby closely combine the blank to the cylindrical member, a fourth step for further subjecting the cold-worked blank to a hot press-working within the cylindrical member to thereby form the blank into a desired shape in the cylindrical member, and a fifth step for annealing the combined members at a temperature for diffusion to thereby tightly join the shaped blank with the cylindrical member. After that, a machining step such as cutting, milling or so on, is followed to provide a finished product of a desired shape. Also, such a machining step can be carried out before the fifth step, that is, between the fourth step and the fifth step.

When a product obtained in the third step is desired, after the third step an annealing step can be followed for tightly joining the combined members by a diffusion annealing method, and further after that, the product can be formed into a desired shape by a machining step. Also, in this case, the machining step can be carried out before the annealing step, that is, between the third step and the annealing step.

Furthermore, to carry out the objects, the present invention comprises a first step for subjecting an internal surface of cylindrical member to a plating such as copper plating, gold plating or so on, a second step for removing stain and oxidation film on the plated surface of the cylindrical member and on the peripheral side surface of the blank, a third step for arranging the blank within the cylindrical member so that the purified side surface of the blank may be faced toward the purified internal surface of the cylindrical member, a fourth step for subjecting the blank to a cold press-working within the cylindrical member to thereby closely combine the blank with the cylindrical member, and a fifth step for further subjecting the cold-worked blank to a hot pressure welding within the cylindrical member to thereby form the blank into a desired shape in the cylindrical member and further to thereby tightly join the shaped blank with the cylindrical member through a plating metal. After that, a machining step is followed to provide a finished product of a desired shape.

In the above-mentioned methods, coefficient of linear expansion of the blank is required to be equal to or more than that of the cylindrical member. And then, flow stress of the cylindrical member is required to be more than at least 2.5 times of that of the blank. Further, at the second press-working step, it is required not to cause relative slide or slip on the contacting plane of the blank and the cylindrical member. A longitudinal length in the contacting plane of the blank and the cylindrical member at the first press-working step is required to be equal to or more than that desired in a finished product. Furthermore, in either of the above-mentioned methods, when the internal surface of the cylindrical member is tapered in thickness, it is possible to manufacture an article of a desired shape without loss in material.

BRIEF DESCRIPTION OF THE DRAWINGS

FIG. 1 is a longitudinal sectional view illustrating an example of an article which is manufactured in accordance with the present invention.

FIGS. 2A to C are longitudinal sectional views illustrating a working process for cold press-working to closely combine, face to face, purified surfaces of the two members.

FIGS. 3A to C are longitudinal sectional views illustrating a press-worked blank within a cylindrical member.

DETAILED DESCRIPTION OF THE INVENTION

Figure 4:
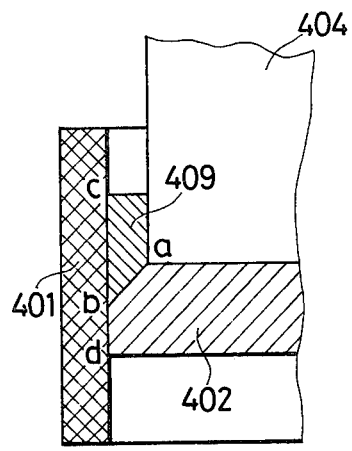
FIG. 4 is a partial sectional view illustrating a plastic flow when press-working a blank in a cylindrical member.

This invention will be hereinafter explained in detail in reference to the drawings.

In the present invention, a metal block (or a blank) is press-worked in a cylindrical (or tubular or hollow) member to closely combine to each other. After that, the blank and the cylindrical member are subject to annealing for diffusion, thermal pressure welding or so on, to tightly join to each other by solid phase welding.

When tightly joining two members by solid phase welding such as diffusion welding, thermal pressure welding or so on, it is very important that two members are sufficiently purified so as not to oxidize the facing planes (or boundary surfaces) of two members to each other even in a heated atmosphere. In order to prevent the oxidation of the facing planes and to get the tight joining thereof, the following methods have been so far used; that is, (1) a method by hot-rolling, according to which two joined members are superimposed and are highly deformed at a high temperature, to thereby cause the respective fresh planes on the boundary surfaces of the two members to join to each other by the pressure which has been loaded, thereon (2) a method by cold-rolling, according to which two members superimposed at a room temperature, are subject to a high deformation to combine to each other, and after that are subject to an annealing for diffusion to further increase the joining force in the two members.

However, in these methods, the rate of deformation (or the reduced quantity in its thickness) required for pressure welding as stated above reaches several times ten percent. Accordingly, such a method that two members are highly deformed, cannot be applied to the present invention. That is, in case that the blank is press-worked within the cylindrical member, it is very difficult to subject the cylindrical member to uniform and high deformation. If forcibly carried out, the cylindrical member is locally deformed, and causes even a rupture as shown in FIG. 6B.

Thus, the present invention has a feature in that without deforming the cylindrical member, only the blank can be deformed and thus the two members are joined due to solid phase welding.

In order that the boundary planes of two members to be joined with solid phase are not oxidized even in a heated atmosphere, in the present invention, the following method will be employed. The methods will be hereinafter explained in reference to FIG. 2.

Firstly, oxidation films arisen on an inner surface 211 of the cylindrical member 201 and on a peripheral side surface 212 of the blank 202 have to be removed. In this way, a method by machining such as a lathing, a filing, a wire brushing or the like to remove any stain of grease, a method by pickling or so on, is carried out in the atmosphere. Secondly, the blank is inserted into the cylindrical member in such a manner that the purified surfaces of the two members may be not soiled, especially, may not pick up a fingerprint and a grease stain. And then, the blank 202 is press-worked in the cylindrical member 201 at a room temperature. For instance, as shown in FIG. 2B, the inserted two members 201 and 202 are arranged into a die 203. Then, a punch 205 is forced into the blank 202 supported on a back punch 205.

As a result, the blank 202 can be deformed into a shape 222 as shown in FIG. 2C, of which the peripheral side surface 212 are strongly and closely combined to the inner surface 211 of the cylindrical members 201. In this, when such a product has been heated, particularly if the coefficient of linear expansion of the blank 202 is equal to or more than that of the cylindrical member 201, the boundary area in which the two members is contacted, can be sufficiently sealed from the air. Thus, in the present step, it is possible to maintain the nearly purified surfaces at a room temperature without oxidizing them.

In this, when the product 222 as shown in FIG. 2C is heated at such a temperature that diffusion may be caused between the two members 201 and 202, they can be easily joined by diffusion. Accordingly, when the shape of the press-worked article to be desired is a shape like a plate as shown in FIG. 2C, or is a shape further desirably formed by an after-working (or after-treatment) such as a machining on the basis of the product obtained in FIG. 2C, it is possible to obtain a combined press-worked article in which the two members 201 and 202 have been tightly joined, by subjecting the product as shown in FIG. 2C to an annealing for diffusion.

On the other hand, when the shape of the press-worked article to be desired is provided with a comparatively thin cylindrical portion 102 as shown in FIG. 1, or is a shape which is difficult to be formed into a desired shape by the after-working, the product as shown in FIG. 2C is further subject to a second press-working, and simultaneously with the second press-working it is possible to tightly join two members by a hot pressure welding. That is, as shown in FIG. 3A to C, a product 302 which has been made by a method in FIGS. 2A to C, is further formed into a product 312 as shown in FIG. 3B at a region of temperature which is possible to carry out a hot pressure welding. After that, an article 322 as shown in FIG. 3C is finished due to the after-working. In this, a region, in the boundary area of a cylindrical member 301 and the press-worked member 312, which is possible to carry out the hot pressure welding due to the second press-working, is mainly limited within a contacting region (its longitudinal length $l_s$) of the product 302 formed at a room temperature. Accordingly, the length $l_s$ of the contacting region of the press-worked product at a room temperature is required to be equal to or more than a longitudinal length $l_f$, as shown in FIG. 3C, of the contacting region to be desired in the article.

On the other hand, to obtain a stable joining force due to a working method as shown in FIGS. 3A to C, it is required not to cause a relative slide (or slip) between the cylindrical member 301 and the press-worked member 312 during the second press-working. That is, in FIGS. 3A to C, a length $l_1$ is required to be nearly equal to a length $l_2$. In more detail, as shown in FIG. 4, it is desirable that when a punch 404 is forced into a blank 402, a portion 409 already formed, that is, an upper portion from the plane a-b, is uplifted together with a cylindrical member 401 without relatively sliding (or slipping). For this, it is required that frictional force at the section b-c is so great that the two members 401 and 402 may be firmly combined, and that at a peripheral side section (that is, the plane b-d) of the member 402 being press-worked, the frictional force is so low that the two members may be apt to cause the relative sliding (or slipping). But, when press-forming into the member 312 like a cup within the cylindrical member 301 of which diameter is axially uniform as shown in FIG. 3B, the above-mentioned condition is hard to carry out, so that the length $l_2$ after being press-worked is apt to be unstable (or not to become constant), and also the joining force is inclined to be unstable.

Figure 5:
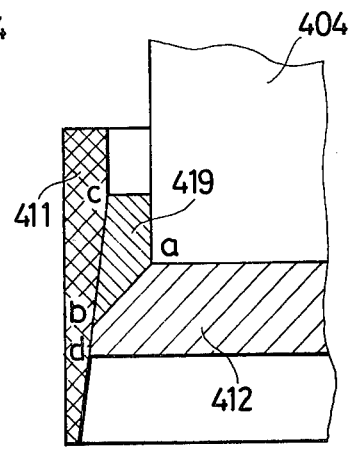
FIG. 5 is a partial sectional view illustrating a plastic flow when press-working a blank in a tapered cylindrical member.

In order to eliminate the above-stated disadvantage and to obtain the stable joining force, as a further improved method, as shown in FIG. 5, a cylindrical member provided with a tapered inner surface has been employed. That is, according to the method as shown in FIG. 5, as a portion 419 already formed is uplifted when a punch 404 is forced into the blank 412, a strong extruding force acts at the section (that is, the plane b-c) between the tapered cylindrical member 411 and the member 419. Also, at the section b-d, the relative slide is apt to be caused because of the existance of the tapered shape within the cylindrical member. As a result, the cylindrical member 411 is uplifted together with the press-worked portion 419. Thus, the relative slide between the cylindrical member 411 and the press-worked portion 419 can be certainly prevented. Then, it is possible to obtain a stable joining force.

Figure 6A:
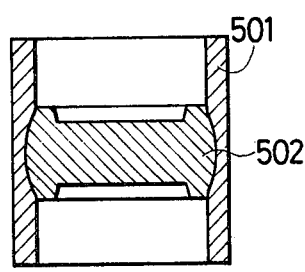
FIGS. 6A and B, respectively, are longitudinal sectional views illustrating deformation and rupture of a cylindrical member caused when material of the cylindrical member is soft.
Figure 6B:
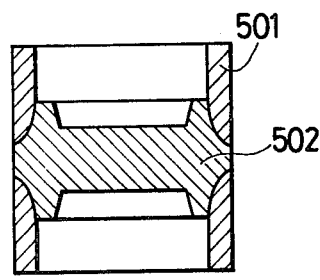
Figure 7:
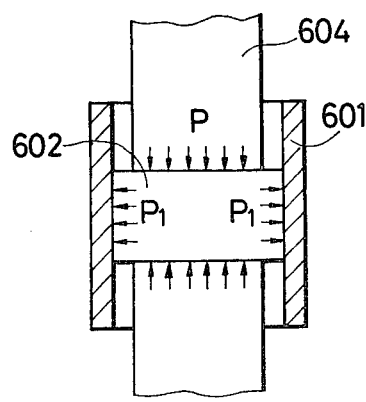
FIG. 7 is a schematic sectional view illustrating a pressure acting when forcing a hob into a blank.
Figure 8:
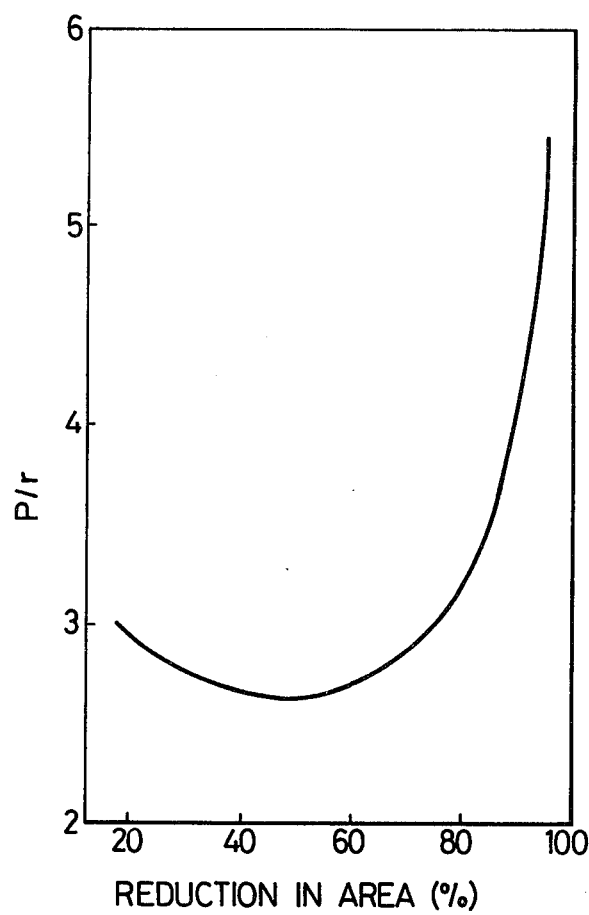
FIG. 8 is a characteristic diagram showing a relation of a pressure acting through a hob to the reduction in area of a blank.

In the above-mentioned method in which the blank is press-worked within the cylindrical member, when a material of the cylindrical member is soft, the cylindrical member becomes highly deformed as shown in FIG. 6A, or further becomes even ruptured, as shown in FIG. 6B, at the first press-working step at a room temperature or at the second press-working step at a high temperature. This is caused because a pressure $p_1$ which acts to the inner surface of the tubular member 601, as shown in FIG. 7, when a punch 604 is forced into the blank 602 disposed within the tubular member 601, exceeds the flow stress of the tubular member 601. In this, the value of $p_1$ is considered to be nearly equal to the pressure p acting through the surface of the punch 604. Besides, the value of p depends upon a press-working condition, especially, a reduction in area (that is, a rate of the cross-sectional area of the punch 604 relative to that of the blank 602) and a lubricating condition, but it is found to be, in short, shown in FIG. 8. That is, the value of p reaches to more than at least 2.5 times relative to the flow stress $\gamma$ of the blank.

Accordingly, in the present invention, the flow stress of the cylindrical member is required to be more than at least 2.5 times relative to that of the blank. The rate of the flow stress with respect to the two members can be determined by various selection of the material with respect to the cylindrical member and the blank, for example, a combination of steel such as a carbon steel, an alloy steel or the like, and copper such as an oxygen free copper or the like. Or further, when the material of the cylindrical member is comparatively soft, the above-stated condition with respect to the flow stress can be achieved due to subjecting the cylindrical material to a hardening or quenching. And then, depending upon the above-mentioned combination with respect to the material of the cylindrical member and the blank, the temperature at the second press-working step and the annealing temperature for diffusion can be determined.

This invention will be hereinafter explained in detail with respect to the embodiments.

Firstly, as the cylindrical member 201 is shown in FIG. 2A, a hardened (or quenched) cylindrical carbon steel (JIS S45C) with carbon content of 0.42 to 0.48% and Rockwell hardness ($H_RC$) of 25 to 45, of which the inner and outer diameters, respectively, are 42 mm and 48 mm, has been employed. And as the blank 202, an oxygen free copper of which the thickness is 10 mm has been employed. The inner surface 211 of the cylindrical member 201 has been purified by milling, cutting or a grinding method. And the outer surface 212 of the blank 202 has been purified by a wire brushing method. After that, the blank 202 has been inserted into the cylindrical member 201 mounted on the back punch within the die. After that, the punch with diameter of 38.5 mm has been forced into the depth of 1 to 3 mm in the blank to thereby form a product as shown in FIG. 2C. Further, after that, the product has been subject to the annealing for diffusion for an hour at the temperature of 800° C. Then, the diffusion has been caused in the two members. As a result, a tight joint of the two members has been achieved with the tensile strength of 15 to 25 kg/mm².

In this, the annealing temperature for diffusion is not limited to 800° C. and may be a temperature for causing the diffusion, for instance, in case of the combination of copper and steel (or iron), practically more than about 650° C. Also, the time which is spent for annealing is not limited to one hour and may be suitably determined. For instance, in case of the annealing temperature of 800° C., even if it is 10 min., the joining force could be achieved in the same extent as that in the above-stated case. Further, the annealing for diffusion is preferable to be carried out in an atmosphere which can prevent the oxidation, for instance, in an atmosphere of hydrogen gas ($H_2$), nitrogen gas ($N_2$) or so on.

On the other hand, the circumstance of occurrence of the deformation due to the hardness of a cylindrical steel (or iron) has been examined. As a result, when the Rockwell hardness is $H_RC$ 25, the cylindrical steel has been a little deformed by the press-working. That is, the inner diameter of the cylindrical steel has caused the increase of about 0.5 mm. In this case, the flow stress of the copper is about 40 kg/mm², and the flow stress of the steel is about 100 kg/mm². Thus, the rate of the flow stress is 2.5. It is preferable that the hardness of the cylindrical steel is more than $H_RC$ 35, or the flow stress thereof is more than 3.5 times relative to that of the copper in order, never to cause the deformation of the cylindrical member.

Secondly, the product which has been press-worked at a room temperature in the above-mentioned first embodiment (in which the hardness of the cylindrical member is $H_RC$ 40) is subjected to the second press-working at a high temperature as shown in FIG. 3B. In this case, the second press-working process has been executed at 550° to 600° C. As a result, when the length $l_2$ has been formed equal to the length $l_1$, the joining force of more than 20 kg/mm² has been obtained. But when the length $l_2$ is the extent of several millimeters less than the length $l_1$, the joining force has become unstable, and does not cause the two members to be joined together.

When the above-mentioned temperature at the second press working process is less than 550° C., for instance, 300° C., the joining force between the two members has remarkably weakened even if the length $l_2$ is nearly equal to the length $l_1$. However, also in this case, as the annealing for diffusion at 800° C. has been further executed after the second press-working process, both the members have been joined by diffusion by which the joining force of more than 20 kg/mm² has been obtained.

Thirdly, in the boundary plane of the cylindrical steel member and the copper blank which has been employed in the above-stated second embodiment, a third metal has been previously lain between, whereby the temperature at the second press-working process (for instance, in the second embodiment, 550° C.) could be lessened.

That is, the inner surface of the cylindrical steel member employed in the second embodiment has been subjected to a copper plating to thereby cause the plated thickness of 10 to 20 μm, and further has been wire-brushed. After that, in accordance with the procedure similar to the second embodiment, the (first) press-working process at a room temperature and further the second press-working process at 300° C. have been executed. In conclusion, the joining force of the product in which the length $l_2$ has been formed equal to the length $l_1$ has been 27 to 32 kg/mm². Also, even if a gold plating instead of the copper plating has been subjected, the same effect as that in case of the copper plating has been obtained.

Accordingly, it is apparent that the temperature at which the tight joining can be obtained by the second press-working, can be reduced to the temperature of less than at least 300° C., by lying therebetween the metal which is inclined to make pressure welding with copper or steel iron. Also, in these methods, to increase the joining force between the cylindrical steel member and the plated metal layer, it is preferred to subject them to the hardening after the plating process.

Furthermore, as a method to attach gold to the inner surface of the cylindrical steel member other than the gold plating method, a method in which the gold is rubbed into the inner surface of the cylindrical steel member, after having purified the inner surface of the cylindrical member, could be carried out also. According to this method, it is possible to reduce the consumed amount (or quantity) of the gold, and to readily attach the gold to the desired portion of the cylindrical member.

Figure 9:
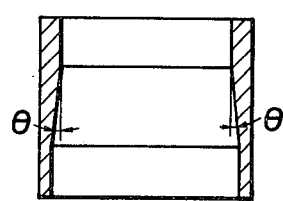
FIG. 9 is a longitudinal sectional view showing a shape of the tapered cylindrical member.

Fourthly, as the cylindrical member, a tapered cylindrical member as shown in FIG. 9 has been employed in the present embodiment, wherein its tapering extent is 1/5, namely, the angle of 5.8°; its material is a carbon steel with the carbon content of 0.42 to 0.48% and its hardness is $H_RC$ 40 to 45 by the Rockwell hardening scale. And then, an oxygen free copper as the material for use in the blank has been employed, wherein its outer diameter is 42 mm, and its thickness is 10 mm. In accordance with the process as shown in FIG. 2A to C, these materials have been press-worked at a room temperature, and in succession has been press-worked at 300° C. in the form of a cup (its inner diameter of 38.5 mm) as shown in FIG. 3B. After that, the product has subjected to the annealing for diffusion at 800° C. As a result, it has become possible to manufacture a combined press-worked article in which the distance $l_2$ from the upper end of the cylindrical member is stabilized, and further in which the joining force of more than 20 kg/mm² can be achieved.

The above-mentioned tapering extent in the inner surface of the cylindrical member depends upon the thickness of the bottom of the press-worked blank at a room temperature before the second press-working process. Namely, the thickness of the bottom thereof increases as the tapering extent, in other words, the angle ($\theta$), increases: for example, the angle ($\theta$) is 3° when the thickness is about 7 mm, 5° at about 8.2 mm, 5.8° at about 9 mm and 7° at about 10 mm See FIG. 9.

Figure 10:
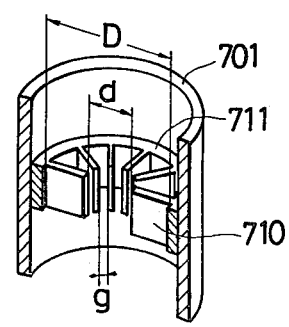
FIG. 10 is a half perspective view illustrating a construction of a new type magnetron anode due to the present invention.

Fifthly, the processes as disclosed in the second and third embodiments have been applied to a method of manufacturing a magnetron anode as shown in FIG. 10. Such a magnetron anode comprises a cylindrical member 701 made of a ferromagnetic material, such as a steel iron or the like, and a copper blank, having a cylindrical peripheral wall 711 and integral vanes 710 inwardly thereof which have been formed by a press-working. The copper blank is joined inwardly of the cylindrical member 701. In this, by applying the cylindrical member 701 to a magnetic circuit, a small-sized and light-weighted magnetron anode can be provided.

In order to manufacture a magnetron anode of such a configuration (for example, the number of vanes 711=12; d=10 mm; D=38.5 mm), at first, the working process as shown in FIG. 11A to E and FIG. 12 has been applied. In this case, the material of the cylindrical member is a carbon steel with the carbon content of 0.42 to 0.48%, which has been hardened to be the Rockwell hardness of $H_RC$ 40 to 45, and the blank has employed a circular shaped oxygen free copper having the outer diameter of 42 mm and the thickness of 10 to 13 mm.

Figure 11A:
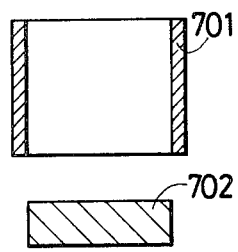
FIGS. 11A to E are longitudinal sectional views illustrating a working process applied to manufacture a magnetron anode in FIG. 10.
Figure 11B:
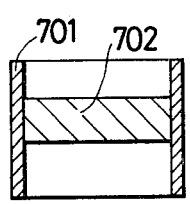
Figure 11C:
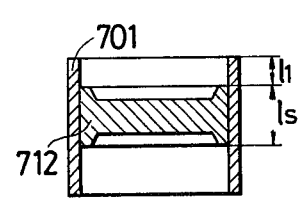
Figure 11D:
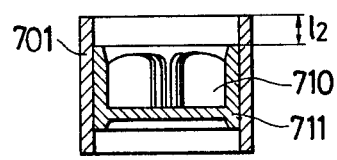
Figure 11E:
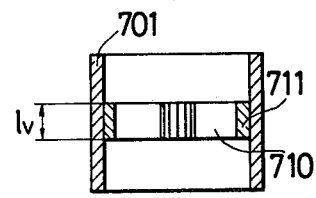
Figure 12:
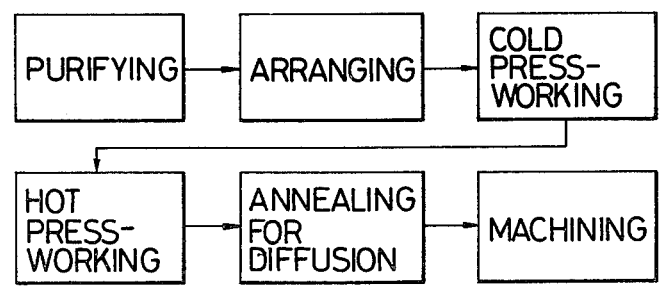
FIG. 12 is a diagram showing the working process in FIGS. 11 A to E.

These materials have been subjected to the working process as shown in FIG. 11A to E and FIG. 12, as well as that in the above-stated second embodiment: that is, a first step for purifying the inner surface of the cylindrical member 701 and the outer surface of the blank 702, as shown in FIG. 11A, a second step for arranging the blank 702 within the cylindrical member 701, as shown in FIG. 11B, a third step for subjecting the blank to a cold press-working (for instance, a press-working at a room temperature) in the cylindrical member 701, to thereby form into a shape 712 as shown in FIG. 11C, a fourth step for further subjecting the cold press-worked blank to a hot press-working (for instance, at 300° C.) in which the integral vanes 710 can be formed inwardly of the cylindrical peripheral wall 711 due to the use of a hob provided with grooves having the depth of, e.g., 3 mm, corresponding to the vanes, as shown in FIG. 11D, a fifth step for annealing the combined members at a temperature for diffusion, e.g., at 800° C., to tightly join to each other, and further a sixth step for machining the tightly joined product to form it into a desired shape as shown in FIG. 11E.

Figure 13:
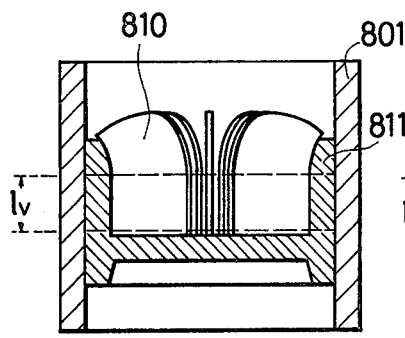
FIG. 13 is a longitudinal sectional view showing vanes formed within a straight cylindrical member.

The shape of the product after the step for forming the vanes, as shown in FIG. 13, is inclined to highly uplift a central portion of the vane 810, while the height $l_v$ of the desirably shaped vanes is, for instance, 5 to 7 mm. If the height $l_v$ of the vanes is desired to be higher, for instance, to be 10 mm, in accordance with the present working process, it is necessary to increase the depth of the grooves of the hob and the thickness of the blank to thereby increase the effective region in the shape of the vanes. However, the amount machined off at the after-working step, namely, at the abovementioned sixth step (wherein the product is machined off at the broken line in FIG. 13), is increased, so that it is not preferable from the economical point of view. In the drawing, numerals 801 and 811, respectively, denote a cylindrical member and a cylindrical peripheral wall.

Figure 14:
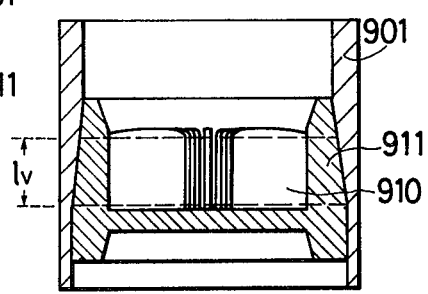
FIG. 14 is a longitudinal sectional view showing vanes formed within a tapered cylindrical member.

Further, instead of the cylindrical member employed in the working process as shown in FIG. 11, the tapered cylindrical steel member 901 as shown in FIG. 14 has been employed to manufacture a magnetron anode as stated above, wherein the tapered member is a carbon steel (JIS S45C) hardened to be $H_RC$ to 40 to 45. In this way, the working condition such as the dimension of the copper blank and the temperature for forming the vanes, is similar to that in the embodiment as shown in FIG. 13.

As a result, during the second press-working at a high temperature, the cylindrical steel member 901 is lifted upwards from the initial position to the height of several millimeters within the die. And then, the amount of the copper which flows to the cylindrical peripheral wall 911, has been increased as shown in FIG. 14. In conclusion, the uplifted central portion of the vanes 810 as shown in FIG. 13 has been remarkably restrained, so that the shape of the vanes 910 has been improved as shown in FIG. 14, and the effective height $l_v$ of the vanes 910 has increased from 10 to 12 mm. Also, as compared with the case which has employed the straight pipe as stated above, in accordance with the present case, an article, in which the distance $l_2$ and the joining force has been greatly stabilized, can be worked with stability and good quality.

The thickness of the copper blank employed in the present working process can be properly selected due to a desired height $(l_v)$ of the vanes; for instance, the thickness of 10 to 12 mm is suitable when the height $(l_v)$ is 10 mm.

Also, the step for after-working can be executed before the step for annealing for diffusion. For example, after having machined by using a lubricant oil, the product has been annealed for diffusion at 800° C. for 10 minutes. As the result, the joining force of more than 20 kg/mm² could be achieved as well as the forming of the above-mentioned embodiment.

Figure 15:
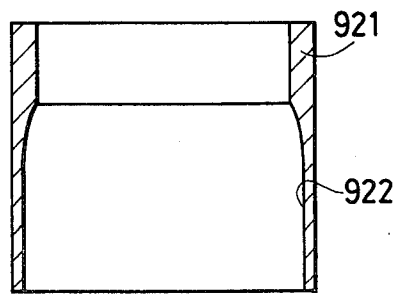
FIG. 15 is a longitudinal sectional view showing another shaped example of the cylindrical member applied instead of a tapered cylindrical member in FIG. 9.

Further, the configuration of the inner surface of the cylindrical steel member employed in the present working process is not limited to the shape as shown in FIG. 9, but it is variously applicable to the shape having the tapering extent of more than 1/10, namely, the angle (θ) of more than about 3° (in case of a magnetron anode, practically, more than about 5°), the shape having the tapered region on the whole inner surface of the cylindrical steel member, the shape having the inner surface 922 gradually curved towards the axial direction as shown in FIG. 15, and so on.

Figure 16:
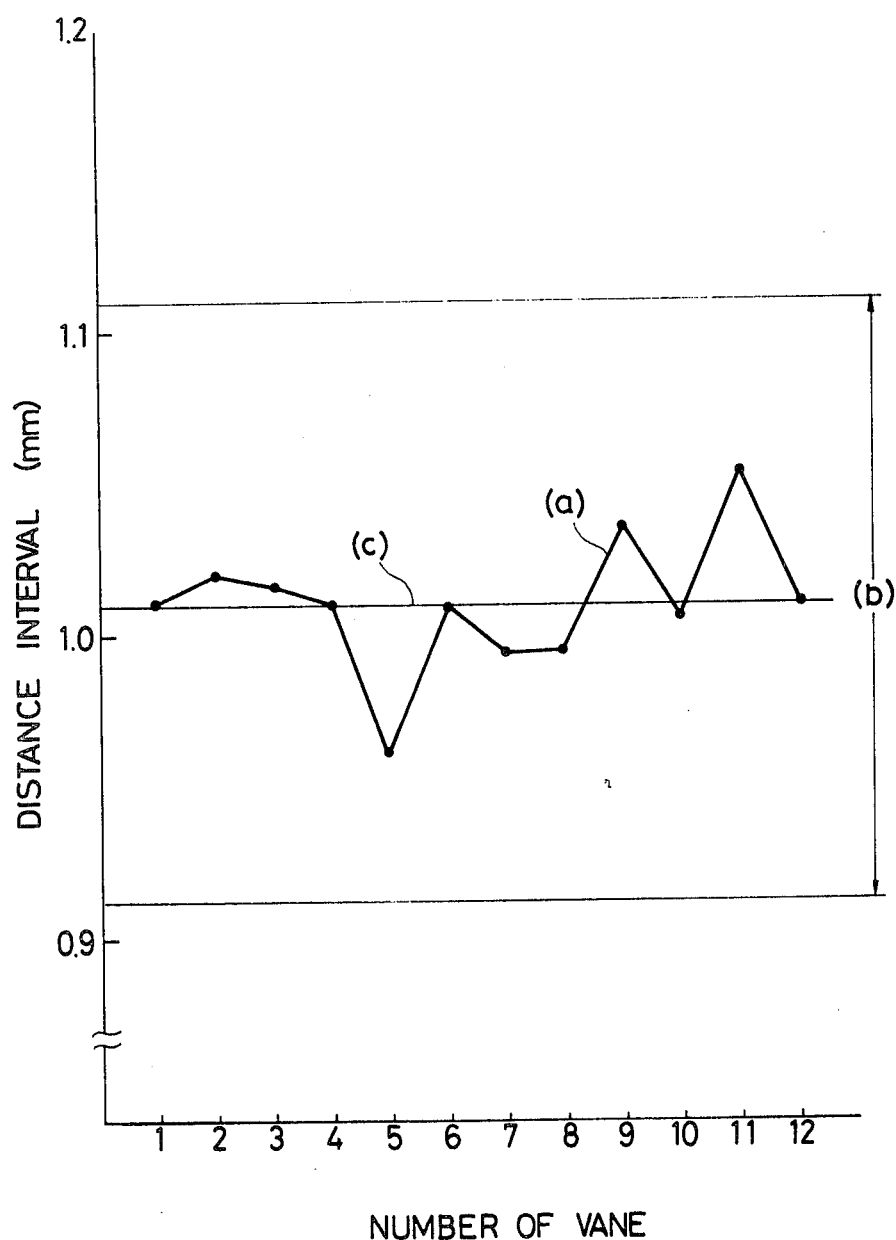
FIG. 16 is a characteristic diagram illustrating the accuracy of dimension of the vanes of the magnetron anode formed by the present invention.

Furthermore, in a magnetron anode manufactured by the present working process, the distance interval (as denoted by the width g in FIG. 10) between the vanes is precisely arranged. For instance, FIG. 16 is a characteristic diagram illustrating the accuracy of dimension with respect to the distance interval of the vanes of the magnetron anode formed by the present working process, wherein the axis of the ordinates denotes the distance interval, and the axis of the abscissas denotes the number of the vanes. Further, in the diagram, the mark (a) denotes the respective distance intervals of the vanes of the magnetron anode formed by the present working process, (b) an initial dimension tolerance of the distance interval of the vanes, and (c) a designed value or an average value of the initial dimension tolerance (b). From the diagram, it is apparent that the respective distance intervals of the vanes formed by the present working process is within the initial dimension tolerance (b), and that it approaches the designed value (c). Also, the oscillation characteristic as a magnetron when assembled by using the article manufactured by the present invention can be greatly improved. Accordingly, the present invention can be applied to the mass production of the article as mentioned above, and further in this case, it is possible to shorten the time for adjusting an electrical characteristic.

As stated in the discussion of the first, fourth and fifth embodiments, the annealing step for diffusion has been executed to strengthen the joining force caused between the two members. However, even if the soldering process is executed instead of the annealing step for diffusion, it is possible to join both the members more economically than that due to the conventional method. Namely, since the blank is tightly joined with the cylindrical member in such a way that the blank is press-worked within the cylindrical member, the present method has advantages in that a tool for soldering is not necessitated, in that the amount of the solder consumed can be reduced, and in that the relative position error can be reduced. Accordingly, as compared with the conventional method in which the two members are joined by the soldering process after they have been made in separate steps, the present method can be achieved more economically.

Further, in the above-mentioned embodiments, a hardened steel has been employed as the cylindrical member. However, in the present invention, when the cylindrical member is made of a steel member such as a carbon steel, having the carbon content of less than 0.45%, it is required to be hardened or quenched in connection with a blank material such as copper, while when it is made of a steel member such as a carbon steel, having the carbon content of more than 0.45%, it does not need to be previously hardened or quenched in connection with a blank material such as copper. For instance, in a combination of a carbon steel having the carbon content of 0.47 to 0.48% as a cylindrical member and an oxygen free copper as a blank, such a carbon steel does not need to be previously hardened or quenched in view of the preceding rate of the flow stress in the two members. In this case, the combined members after the cold press-working step is subject to the second press-working step at the temperature of about 400° C.

It is needless to say that the present invention is not limited to the concrete examples and the numeral values as stated above.

As detailed above, the present invention has many advantages in a case where it is applied to the mass production of an article having a construction which has reliably tightly joined a press-worked member of a desired shape inwardly of a cylindrical member, and especially, the present invention has great effect in that it is applied to the mass production of a new type magnetron anode as shown in FIG. 10.

We claim:

1. A method of manufacturing an article having a press-worked member inwardly of a cylindrical member, said method comprising:
   a first step for removing stain and oxidation film on the inner surface of a hollow member and on the peripheral side surface of a blank,
   a second step for arranging said blank inwardly of said hollow member so that the purified surfaces of said blank and said hollow member may be faced toward each other,
   a third step for subjecting said blank to a press-working in said hollow member to combine it with said hollow member and to form it into a desired shape, and
   a fourth step for subjecting the combined members to an after-treatment to thereby provide said article of a desired shape in which said blank is tightly joined inwardly of said hollow member,
   wherein said third step comprises a step for subjecting said blank to a cold press-working in said hollow member, and after that another step for subjecting said blank to a hot press-working in said hollow member to form said blank into a desired shape.

2. A method according to claim 1, wherein said fourth step comprises a step for subjecting the combined members to an annealing for diffusion to tightly join said blank inwardly of said hollow member, and after that another step for subjecting the joined members to a machining to form them into a desired shape.

3. A method according to claim 1, wherein said fourth step comprises a step for subjecting the combined members to a machining to form them into a desired shape, and after that another step for subjecting the combined members to an annealing for diffusion to tightly join said blank inwardly of said hollow member.

4. A method according to claim 1, wherein the coefficient of linear expansion of said blank is equal to or more than that of said hollow member.

5. A method according to claim 1, wherein flow stress of said hollow member is more than at least two and a half times that of said blank.

6. A method according to claim 1, wherein said hollow member comprises a cylindrical member tapered on the inner surface thereof.

7. A method according to claim 6, wherein said hollow member is made of a carbon steel.

8. A method according to claim 6, wherein said blank is made of an oxygen free copper.

9. A method according to claim 8, wherein said hollow member is made of a carbon steel.

10. A method according to claim 1, wherein said blank is made of a copper.

11. A method according to claim 1, wherein said hollow member comprises a cylindrical steel member.

12. A method of manufacturing a magnetron anode having a press-worked member inwardly of a cylindrical member, said method comprising;
   a first step for removing stain and oxidation film on the inner surface of a cylindrical member and on the peripheral side surface of a blank,
   a second step for arranging said blank inwardly of said cylindrical member so that the purified surfaces of said blank and said hollow member may be faced to each other,
   a third step for subjecting said blank to a cold press-working in said cylindrical member to combine said blank with said hollow member,
   a fourth step for subjecting said blank to a hot press-working in said cylindrical member to form a product having a cylindrical periperal wall and integral vanes inwardly thereof in said cylindrical member, and
   a fifth step for subjecting said product to an after-treatment to thereby provide said magnetron anode of a desired shape in which said blank is tightly joined inwardly of said cylindrical member.

13. A method according to claim 12, wherein said fifth step comprises a step for subjecting said product to an annealing for diffusion, and after that another step for subjecting said product to a machining to form it into a desired shape.

14. A method according to claim 12, wherein said fifth step comprises a step for subjecting said product to a machining to form it into a desired shape, and after that another step for subjecting said product to an annealing for diffusion.

15. A method according to claim 12, wherein the coefficient of linear expansion of said blank is equal to or more than that of said cylindrical member.

16. A method according to claim 12, wherein flow stress of said cylindrical member is more than at least two and a half times that of said blank.

17. A method according to claim 12, wherein said cylindrical member is tapered on the inner surface thereof.

18. A method according to claim 17, wherein said cylindrical member and said blank, respectively, are made of a carbon steel and an oxygen free copper.

19. A method according to claim 12, wherein said third step comprises a step for subjecting said blank to a press-working at a room temperature.

* * * * *